US008627345B2

(12) United States Patent
Malik et al.

(10) Patent No.: US 8,627,345 B2
(45) Date of Patent: Jan. 7, 2014

(54) APPARATUS, SYSTEM, AND METHOD FOR SOAP ACCESS TO DATA SOURCE PROCEDURES

(75) Inventors: Amir Malik, Fremont, CA (US); Hardeep Singh, Fremont, CA (US)

(73) Assignee: International Business Machines Corporation, Armonk, NY (US)

(*) Notice: Subject to any disclaimer, the term of this patent is extended or adjusted under 35 U.S.C. 154(b) by 1540 days.

(21) Appl. No.: 11/762,682

(22) Filed: Jun. 13, 2007

(65) Prior Publication Data
US 2008/0313660 A1  Dec. 18, 2008

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................... 719/330

(58) Field of Classification Search
USPC .......................................... 719/330
See application file for complete search history.

(56) References Cited

U.S. PATENT DOCUMENTS

| | | | |
|---|---|---|---|
| 6,721,807 B2 | 4/2004 | Vlissides | 709/315 |
| 2003/0145103 A1* | 7/2003 | Pruyne et al. | 709/237 |
| 2003/0163450 A1* | 8/2003 | Borenstein et al. | 707/1 |
| 2003/0208533 A1 | 11/2003 | Farquharson et al. | 709/203 |
| 2004/0088713 A1 | 5/2004 | Myllymaki et al. | 719/315 |
| 2004/0193635 A1* | 9/2004 | Hsu et al. | 707/102 |
| 2004/0205187 A1* | 10/2004 | Sayal et al. | 709/224 |
| 2004/0225724 A1 | 11/2004 | Pavlik et al. | 709/219 |
| 2004/0243944 A1 | 12/2004 | Sabiers et al. | 715/853 |
| 2005/0015491 A1* | 1/2005 | Koeppel | 709/226 |
| 2006/0136351 A1* | 6/2006 | Angrish et al. | 707/1 |
| 2006/0206883 A1* | 9/2006 | Sabbouh | 717/146 |
| 2007/0294133 A1* | 12/2007 | Lasker et al. | 705/14 |

FOREIGN PATENT DOCUMENTS

| | | | |
|---|---|---|---|
| EP | 1696633 | 8/2006 | H04L 29/08 |
| JP | 2005/322222 | 11/2005 | H04L 12/66 |

OTHER PUBLICATIONS

Myerson et al., "How to Call DB2 Stored Procedures in Visual Basic 6.0 Applications", Mar. 2003, 34pgs.
Fielding et al., "Hypertext Transfer Protocol HTTP/1.1", Jun. 1999, http://www.ietf.org/rfc/rfc2616.txt, 116pgs.
Franks et al., "HTTP Authentication: Basic and Digest Access Authentication", Jun. 1999 ftp://ftp.isi.edu/in-notes/rfc2617.txt, 23pgs.

* cited by examiner

*Primary Examiner* — Andy Ho
*Assistant Examiner* — Timothy A Mudrick
(74) *Attorney, Agent, or Firm* — Kunzler Law Group, PC

(57) ABSTRACT

An apparatus, system, and method are disclosed for web service access to a remote data source procedure. The method includes receiving a web service request from a client and identifying the procedure call identifier within the web service request. The web service request includes a procedure call identifier and zero or more parameters. The method includes creating a procedure call to a data source procedure accessible through an Application Program Interface. The procedure call is created at least in part by ordering parameters of the procedure call based on an order of the zero or more parameters in the web service request. The parameters of the procedure call are ordered without using an explicit parameter mapping. The method includes sending a web service response to the client in response to receiving a response from the data source procedure. The web service response includes information responsive to the procedure call.

33 Claims, 6 Drawing Sheets

APPARATUS, SYSTEM, AND METHOD FOR SOAP ACCESS TO DATA SOURCE PROCEDURES

BACKGROUND OF THE INVENTION

1. Field of the Invention

This invention relates to web services and more particularly relates to Simple Object Access Protocol ("SOAP") access to data source procedures.

2. Description of the Related Art

A popular computer network architecture is a client-server network. In this architecture, a client sends requests over a computer network to a server, which responds to the requests. The client-server architecture may be implemented with many network types. The Internet is and example of a computer network that relies on client-server relationships. Clients are typically personal computers, laptop computers, etc. with a web browser. The client sends out requests over the Internet to web servers around the world for web services. Web servers, in turn, may request other web services to formulate a response to the client's request.

A client request may be for a file or a directory, but may also be a request to access a data source procedure. A data source procedure, once called, executes a computer program, a subroutine, or the like, which typically returns information from a data source. Typically a data source procedure requires zero or more parameters to be passed to the data source procedure by way of a procedure call. The data source procedure then may return requested information or results or may also return some kind of message, such as an error message.

One common type of data source is a database. A database is typically managed by a database server or a database management system. A procedure call to the database server may be used to retrieve data from the database managed by the database server. The database server may respond to database commands. Each database command typically performs a different function to manipulate and/or extract data in the database to provide desired information or a desired result. Typically, one or more parameters are passed to a database command using a procedure call. The database command executes and returns requested information or other message. For example, a banking database server may respond to a procedure call containing an account number as a parameter to prepare an account statement.

A data source procedure, or database command if a database is the data source, typically differs from a request for a request for a file, etc. in that the data source procedure requires more than merely retrieving a particular table entry, file, or directory. Many files, directories, tables, etc. are currently available over the Internet by way of a web service in a client-server relationship. Currently, web services are being developed as part of a Service Oriented Architecture ("SOA"). A SOA is advantageous because a client can access information from a server independent of the data path between the client and the server and does not require a connection to be maintained until the response is sent.

One protocol that follows the SOA standard is Simple Object Access Protocol ("SOAP"). SOAP is a protocol for exchanging Extensible Markup Language ("XML") messages over computer networks such as the Internet, typically using Hypertext Transfer Protocol ("HTTP"). SOAP provides a basic message messaging framework upon which more abstract layers can build. SOAP messages commonly use a Remote Procedure Call ("RPC") pattern, in which one network node (the client) sends a request message to another network node (the server), and the server sends a response message back to the client. SOAP messages are typically for data source procedures and are distinguished from other HTTP messages that may request a file or directory. SOAP is a popular protocol for XML messages. However, other protocols are also available and provide similar benefits, such as XML Remote Procedure Call ("XML-SOAP") and Representational State Transfer ("REST").

Many databases and other data sources are legacy data sources and may not have been designed as a web service. Significant resources may be invested in legacy databases and the owners typically would rather make a database available as a web service rather than converting a database to a type that allows web access. Examples of legacy database programs are DB2® from International Business Machines, Oracle® from Oracle Corporation, MySQL® from MySQL AB, and Sybase® from Sybase Inc. Many other legacy data sources not contained in database form contain useful information that may be made available to users if offered as a web service.

Legacy database systems may, for example, be available through a user through a user interface. Currently, making a database available as a web service requires a change to a web server to include explicit mapping of database commands and parameters necessary to expose database procedures as a web service. Typically the Web Services Description Language ("WSDL") is used to communicate details about how a client may call and use a web service. In addition, the web server or application server references an explicit mapping that defines how the web service name and parameters map to database procedure names and parameters. This is a disadvantage because data source owners and/or database developers must create a custom mapping for every database procedure. This mapping must be deployed to the web server configured to communicate with the data source. Requiring a database owner or developer to create an explicit mapping to make a data source and/or its database procedures accessible as a web service is cumbersome and inefficient. Data source administrators may be exposed to client technologies with which they might not be familiar or comfortable.

SUMMARY OF THE INVENTION

From the foregoing discussion, it should be apparent that a need exists for an apparatus, system, and method that would eliminate a requirement for explicit mapping for a data source procedure to make a data source available as a web service. Beneficially, such an apparatus, system, and method would use an implicit mapping of a web service request with a data source procedure and accompanying ordered parameters to create a procedure call. The apparatus, system, and method would not require a data source owner to create a custom middle layer with explicit mapping of the data source procedure and parameters.

The present invention has been developed in response to the present state of the art, and in particular, in response to the problems and needs in the art that have not yet been fully solved by currently available methods to provide web access to data source procedures. Accordingly, the present invention has been developed to provide a method, apparatus, and system for web service access to a remote data source procedure that overcome many or all of the above-discussed shortcomings in the art.

A method of the present invention is also presented for web service access to a remote data source procedure. The method in the disclosed embodiments substantially includes the steps necessary to carry out the functions presented below with respect to the operation of the described apparatus and system. In one embodiment, the method includes receiving a web service request from a client and identifying the procedure call identifier within the web service request. The web service request includes a procedure call identifier and zero or more parameters. The method includes creating a procedure call to a data source procedure accessible by way of an Application Program Interface ("API"). The data source procedure is identified by the procedure call identifier without an explicit procedure call identifier mapping. The procedure call is created at least in part by ordering parameters of the procedure call based on an order of the zero or more parameters in the web service request and the parameters of the procedure call are ordered without using an explicit parameter mapping. The method includes sending a web service response to the client in response to receiving a response from the data source procedure. The web service response includes information responsive to the procedure call.

In one embodiment, the method includes confirming that the data source procedure associated with the procedure call identifier is supported by a coupled data source server. In another embodiment, the method includes verifying that the type of data for the zero or more parameters of the web service request matches zero or more parameters of the data source procedure. In another embodiment, the web service request is in the form of a Simple Object Access Protocol ("SOAP") request. In yet another embodiment, the SOAP request is coded using an extended markup language ("XML") and a Hyper Text Transfer Protocol ("HTTP").

The procedure call, in one embodiment, includes a database call and the data source procedure includes a database stored procedure managed by a database server. In another embodiment, the method includes identifying a database type from the web service request and selecting a servlet. The servlet is capable of creating a procedure call compatible with the database type. The method also includes creating a web service response based on a response from a database server of the database type. In another embodiment, the database call includes a native call to a database server where the native call is compatible with a client interface supported by the database server. In a further embodiment, the client interface is Java Database Connectivity ("JDBC"), Object Linking and Embedding Database ("OLE DB"), Open Database Connectivity ("ODBC"), or Call Level Interface ("CLI"). In yet another embodiment, the database server is DB2, Oracle, MySQL, or Sybase.

In one embodiment, ordering the zero or more parameters of the procedure call without using an explicit parameter mapping includes ordering the zero or more parameters of the procedure call without referencing an explicit mapping defined for an application server receiving the web service request. In another embodiment, the web service request is an XML Remote Procedure Call ("XML-RPC") request or a Representational State Transfer ("REST") request.

The apparatus for web service access to a remote data source procedure is provided with a plurality of modules configured to functionally execute the necessary steps of receiving a web service request, creating a procedure call, and sending a response back to a client. These modules in the described embodiments include a receive module that receives a web service request from a client. The web service request includes a procedure call identifier and zero or more parameters. The apparatus includes an identification module that identifies the procedure call identifier within the web service request. The apparatus includes a call module that creates a procedure call to a data source procedure by way of an API. The data source procedure is identified by the procedure call identifier without an explicit procedure call identifier mapping. The procedure call is created at least in part by ordering parameters of the procedure call based on an order of the zero or more parameters in the web service request and the parameters of the procedure call is ordered without using an explicit parameter mapping. The apparatus includes a response module that sends a web service response to the client in response to receiving a response from the data source procedure. The web service response includes information responsive to the procedure call.

A system of the present invention is also presented for web service access to a remote data source procedure. The system may be embodied by a data source and a web server with a processor and a memory in communication with the data source and a client. In particular, the web server includes a receive module that receives a web service request from a client. The web service request includes a procedure call identifier and zero or more parameters. The web server includes an identification module that identifies the procedure call identifier within the web service request. The web server includes a call module that creates a procedure call to a data source procedure by way of an API. The data source procedure is identified by the procedure call identifier without an explicit procedure call identifier mapping. The procedure call is created at least in part by ordering parameters of the procedure call based on an order of the zero or more parameters in the web service request and the parameters of the procedure call is ordered without using an explicit parameter mapping. The web server includes a response module that sends a web service response to the client in response to receiving a response from the data source procedure. The web service response includes information responsive to the procedure call.

In one embodiment, the data source server is a database server and the data source is a database. In a further embodiment, the database server is a DB2 server, an Oracle server, a MySQL server, or a Sybase server and the database is encoded in a format compatible with the database server.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
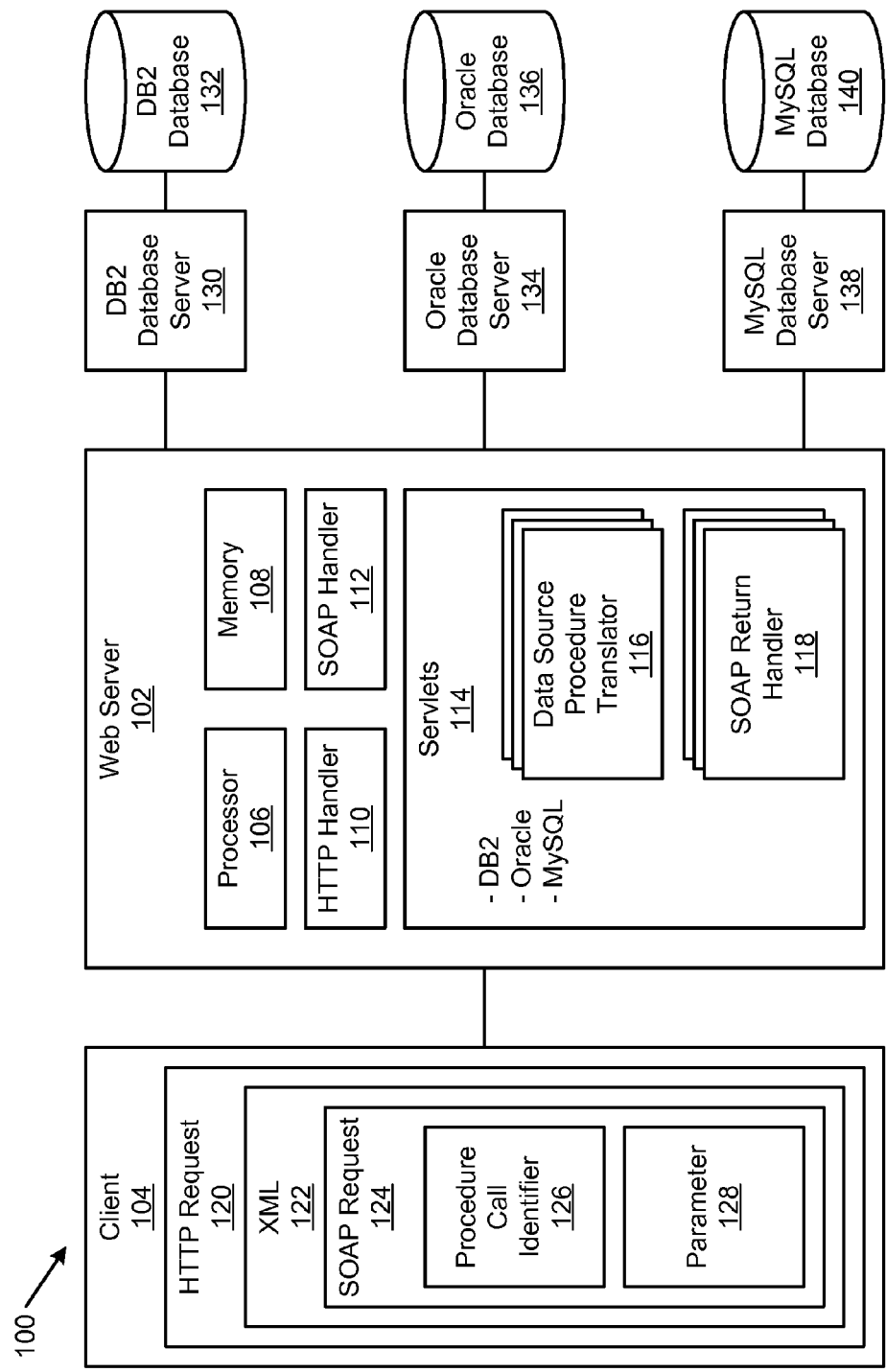
FIG. 1 is a schematic block diagram illustrating one embodiment of a system for web service access to a remote data source procedure in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Where modules or portions of modules are implemented in software, the software is stored on a computer readable medium.

Indeed, a module of executable code maybe a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 for web service access to a remote data source procedure in accordance with the present invention. FIG. 1 is a general diagram describing one possible system 100 for the present invention. A more detailed description of the present invention is included in FIG. 2. The system 100 includes a web server 102 and a client 104. The web server 102 includes a processor 106, a memory 108, a Hypertext Transfer Protocol ("HTTP") handler 110, a Simple Object Access Protocol ("SOAP") handler 112, and servlets 114. The servlets 114 each include a stored procedure translator 116 and a SOAP return handler 118.

The client 104 includes an HTTP request 120. The HTTP request 120 is an Extensible Markup Language ("XML") message 122. The XML message 122 is a SOAP request 124 with a procedure call identifier 126 and zero or more parameters 128. The system 100 includes a DB2 database server 130 communicating with a DB2 database 132, an Oracle database server 134 communicating with an Oracle database 136, and a MySQL database server 138 communicating with a MySQL database 140. The database servers 130, 134, 136 are in communication with the web server 102. Each element of the system 100 is described below in more detail.

In general, the present invention overcomes the limitations of the prior art by allowing a client 104 to a send web service request to a data source without explicit mapping done by middleware such as a web server 102. Software comprising the present invention may be installed on a web server 102 serving a data source such as a database 132, 136, 140 without customizations specific to the database 132, 136, 140 such as adding explicit mapping instructions for data source procedures and related parameters. The present invention provides an implicit mapping between a procedure identifier 126 and parameters 128 of a web service request and a procedure call to the data source.

In a preferred embodiment, the present invention identifies the procedure call identifier 126 and parameters 128 with the structure of a SOAP request 124 written as an XML message 122 and sent as an HTTP request 120. The present invention then creates a procedure call based on the procedure call identifier 126 as a namespace of the SOAP request 124. The present invention formats the procedure call with the parameters 128 of the SOAP request 124 based on the order of the parameters found within the SOAP request 126. The present invention then makes a blind procedure call to the data source. The present invention then formats results received in a reply from the data source into a SOAP return message that is then sent to the client 104.

Beneficially, a data source owner (or database 132, 136, 140 owner) need not modify any middleware to provide access to the data source as a web service. A client 104 also does not require knowledge of explicit mapping rules defined for the web server 102 receiving the web service request. The client 104 must simply have knowledge of the data source procedure and related parameters and parameter ordering. The client 104 can then simply create a SOAP request 124 (or similar request) with the correct procedure call identifier in the namespace of the SOAP request 124 and then place the proper parameters in order in the SOAP request 124 without any regard to what is happening in the middleware (web server 102).

The system 100 includes a web server 102 in communication with at least one client 104 over a computer network such as the Internet. The computer network may includes switches, routers, other web servers, cables, wireless connections, and other equipment known to those of skill in the art. The web server 102 includes a computer with one or more processors 106 and memory 108. The web server 102 may include other servers and processes for facilitating communication with a client and for providing web services. One of skill in the art will recognize other features and functions of a web server 102.

The web server 102 includes an HTTP handler 110 that receives and processes HTTP requests, responses, messages, etc. 120. In one embodiment, the HTTP handler 110 receives HTTP requests 120 and parses SOAP requests 124 from other requests and then sends the SOAP requests 124 to the SOAP handler 112. The HTTP handler 110 may include other servers, processes, handlers, etc. to handle various web service requests. The HTTP handler 110 may also parse out SOAP requests 124 from an HTTP request 120 and then send the SOAP request 124 to the SOAP handler 112 while processing or otherwise handling the non-SOAP portions of the HTTP request 120. In other embodiments, the SOAP handler 112 may receive SOAP requests 124 from other types of web service requests other than HTTP requests 120.

The SOAP handler 112 handles web service requests and portions of web service requests that include embedded SOAP requests 124. In one embodiment, the SOAP handler 112 handles SOAP requests 124 that are part of an HTTP request 120. A SOAP request 124 is typically distinguished from other HTTP requests 120 without a SOAP message in that SOAP requests 124 typically involve a call to some type of data source procedure, function, subroutine, etc. where other HTTP requests 120 typically include a request for a specific file, directory, table entry, etc. and often does not invoke a function, subroutine, etc.

In one embodiment, the SOAP handler 112 determines which database type is requested and then sends the SOAP request 124 to a servlet 114 that handles database requests of the database type. For example, if the SOAP handler 112 determines that a SOAP request 124 is a request to a DB2 database 132, the SOAP handler 112 sends the SOAP request to a DB2 servlet 114.

A stored procedure translator 116 in the DB2 servlet 114 then creates a procedure call from the SOAP request 124. The stored procedure translator 116 may then send a generated procedure call to the appropriate database server 130, 134, 138. In another embodiment, another part of the web server 102 sends the procedure call to the appropriate database server 130, 134, 138. In another embodiment, the web server 102 is in communication with a single data source so that the SOAP handler 112 sends the SOAP request 124 to a stored procedure translator 116 that creates a procedure call for that data source.

The web server 102, in one embodiment, includes a SOAP return handler 118 that handles results from a data source, such as a database server 130, 134, 138 and formats the results in a SOAP message that is returned to the client 104 in response to a SOAP request 124 corresponding to the results. The SOAP return handler 118 may be part of a servlet 114 of a particular data source or database 132, 136 140, may be in communication with a servlet 114, or, in the case of a single data source or database 132, 136, 140, may reside in the web server 102. In another embodiment, the SOAP return handler 118 is included with the SOAP handler 112. The SOAP return handler 118 formats the results using the SOAP protocol. The SOAP return handler 118, in one embodiment, returns the SOAP return message to the client 104. In another embodiment, the HTTP handler 110 or other function within the web server 102 returns the SOAP return message 104 to the client 102.

The system 100 includes at least one client 104. The client 104 may be a personal computer, a laptop computer, a workstation, a server accessed by other computers, a hand held device such as a personal digital assistant ("PDA"), a cellular phone, or the like, a mainframe computer, a cable box, or other computing device capable of sending a web service request. The client 104 makes a web service request in the form of a SOAP request 124. In one embodiment, the SOAP request 124 is formatted using an Extensible Markup Language ("XML") 122. The SOAP request 124, in another embodiment, is comprises or is a part of an HTTP request 120. In other embodiments, the SOAP request 124 may be formatted using another programming language or may be sent using a protocol other than HTTP.

The SOAP request 124 includes a procedure call identifier 126 and zero or more parameters 128. The procedure call identifier 126 is a name of a data source procedure or some other designated way to signify to the web server 102 that the client 104 intends to call the data source procedure by way of the SOAP request 124. In one embodiment, the data source procedure is a stored procedure. In another embodiment, the data source procedure is a remote procedure call ("RPC"). The procedure call identifier 126 invokes the RPC or stored procedure for executing a function or retrieving data from a data source. The data source may be a database 132, 136, 140 or other location where data is stored. One of skill in the art will recognize other procedure call identifiers 126 used to invoke a data source procedure by way of a SOAP request 124.

The procedure call identifier 126 is implicitly mapped to the data source procedure without any explicit mapping. Prior art methods required an explicit mapping between the name of the data source procedure and a procedure call identifier 126 received from a client 104. With explicit mapping, the name of the data source procedure and the procedure call identifier 126 could be different. However, a data source 132, 136, 138 administrator was required to provide the explicit mapping to the middleware web server 102 defining what procedure call identifiers would be allowed and would trigger creation of a data call with the name of the data source procedure derived from the explicit mapping. The present invention does not require the explicit mapping, but instead provides an implicit mapping by blindly mapping the procedure call identifier 126 to a data source procedure name slot within a created procedure call. The same procedure call identifier 126 that is received from the client 104 in a web service request is used to form the procedure call.

The SOAP request 124 also includes zero or more parameters 128. Each parameter 128 is formatted in the SOAP request 124 to be used with the procedure call identifier 126 to create a procedure call to the data source procedure. A parameter 128 may be a number, an array, a range, a string, a data structure, or any other form required by the data source procedure. The parameters 128 are arranged in order in the SOAP request 124 so that the data source procedure translator 116 can create a procedure call to the data source based on the order of the parameters without any explicit mapping between the parameter 128 and required parameters of the data source procedure. The significance of placement of the parameters 128 in the SOAP message will be discussed in further detail in the discussion of FIG. 2.

The system 100 includes one or more data sources. FIG. 1 depicts a system 100 with three databases 132, 136, 140 and accompanying database servers 130, 134, 138. A system 100 of the present invention may include any number of data sources in communication with a web server 102. Each database server 130, 134, 138 communicates with the web server 102 over a client interface. The client interface may be Java Database Connectivity ("JDBC"), Object Linking and Embedding Database ("OLE DB"), Open Database Connectivity ("ODBC"), Call Level Interface ("CLI"), or any other client interface that allows the web server 102 to issue requests and receive responses from a database 132, 136, 140 through a database server 130, 124, 138. The client interface may use an application programming interface ("API"). One of skill in the art will recognize other ways that a web server 102 may send requests to and receive responses from a database 132, 136, 140.

Each database server 130, 134, 138 is running on one or more computers and includes a database management system to access data in an associated database 132, 136, 140. For example, a DB2 database server 130 includes a database management system with software, connections, etc. sufficient to access the DB2 database 132. Each database 132, 136, 140 comprises data storage devices of some form. For example, each database 132, 136, 140 may include one or more hard disk drives, tape storage drives, optical drives, and the like. The data storage devices may be individually accessible, may be in a Redundant Array of Independent/Inexpensive Disks/Drives ("RAID"), may be part of a storage area network ("SAN"), etc. Each database 132, 136, 140 may have a backup copy which may comprise a synchronous mirror, and asynchronous mirror, or the like. One of skill in the art will recognize other ways that a database 132, 136, 140 may be implemented and managed by a database server 130, 134, 138.

Figure 2:
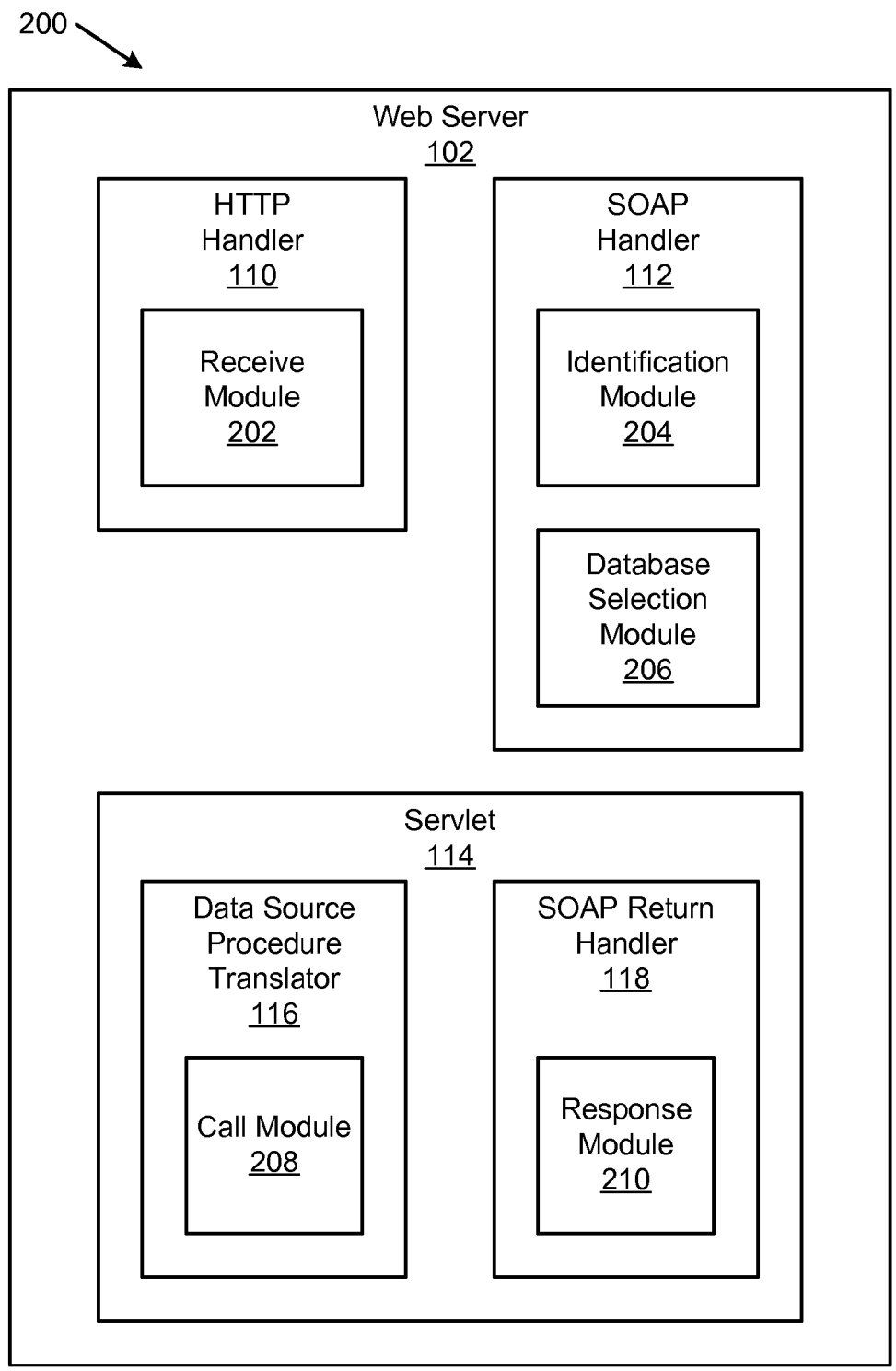
FIG. 2 is a schematic block diagram illustrating one embodiment of an apparatus for web service access to a remote data source procedure in accordance with the present invention.

FIG. 2 is a schematic block diagram illustrating one embodiment of an apparatus 200 for web service access to a remote data source procedure in accordance with the present invention. The apparatus 200 includes a web server 102 with an HTTP handler 110, a SOAP handler 112, and a servlet 114 with a data source procedure translator 116 and a SOAP return handler 118, which are substantially similar to those described in relation to the system 100 of FIG. 1. The apparatus 100 also includes a receive module 202, an identification module 204, a database selection module 206, a response module 210, and a call module 208 which are described below.

The apparatus 200 includes a receive module 202 that receives a web service request from a client 104. The web service request comprises a procedure call identifier 126 and zero or more parameters 128. Typically the receive module 202 is part of the HTTP handler 110 when the web service request is in the form of an HTTP request 120. The receive module 202, in another embodiment, may also be incorporated in some other way in the web server 102 and may receive non-HTTP web service requests with a procedure call identifier 126 and zero or more parameters 128. The HTTP handler 110 may receive other HTTP requests 120 as well that do not include SOAP call having a procedure call identifier 126. Such requests may be serviced by the HTTP handler 110 to retrieve file, directory, table entry, etc.

The apparatus 200 includes an identification module 204 that identifies the procedure call identifier 126 within the web service request. In one embodiment, the identification module 204 is part of the SOAP handler 112. In another embodiment, the identification module 204 operates partially or completely separate from the SOAP handler 112.

The identification module 204, in one embodiment, determines if a web service request is an HTTP request 120. In another embodiment, the identification module 204 determines if the web service request uses an HTTP POST method (or verb). Typically, HTTP requests 120 may be in the form of the following methods: HEAD, GET, POST, PUT, DELETE, TRACE, OPTIONS, and CONNECT. A POST method submits data to be processed to an identified resource and the data is included in the body of the request. Typically, a SOAP request 124 with a procedure call identifier 126 and parameters 128 is submitted using a POST method in order to submit data. Determining if an HTTP request 120 uses a POST method or uses other HTTP methods, such as a GET or a HEAD, can be used as a test to distinguish between a web service request not accessing a data source procedure and a web service request accessing a data source procedure.

In another embodiment, the identification module 204 determines if the web service request is a SOAP request 124. In another embodiment, the identification module determines if a web service request is an XML message 122. Optionally, the identification module 204 determines if parameters 128 of the web service request are of a correct type. When the identification module 204 determines that a web service request does not comply with a requirement, the identification module 204 may generate an error, return the web service request for further processing, trigger another function, etc. The filtering functions of the identification module 204 provide a way to verify that the web service request complies with formatting requirements prior to further processing by the call module 208.

Where protocols other than SOAP are used, such as XML Remote Procedure Call ("XML-RPC") and Representational State Transfer ("REST"), the identification module 204 may be altered to verify that a web service request complies with the requirements of the particular protocol being used. In another option, the identification module 204 confirms that data source procedure associates with the procedure call identifier 126 identified as part of the web service request is supported by a coupled data source server. For example, the identification module 206 may confirm that a database procedure of a coupled DB2 database 132 associated with a DB2 procedure call identifier in a SOAP request 124 is supported by the DB2 database server 130. One of skill in the art will recognize other ways that the identification module 204 may be used to filter web service requests to ensure that a web service request complies with formatting requirements prior to further processing.

Where the web server 102 communicates with multiple data sources, the web server 102 includes a database selection module 206 that identifies a data source or database type 132, 136, 140 from the web service request and selects a servlet 114 capable of creating a procedure call compatible with the data source or database type 132, 136, 140. The servlet 114, through a SOAP return handler 118, also creates a web service response based on a response from a data source or database server 130, 134, 138 of the data source or database type 132, 136, 140. A web server 102 may then service multiple data sources by having a servlet 114 for each data source. In another embodiment, a servlet 114 may communicate with two or more data sources. The database selection module 206 may reside in the SOAP handler 112 or another location in the web server 102. Typically the database selection module 206 acts as a switch to redirect a web service request to a data source identified in the web service request.

The web server 102 includes a call module 208 that creates a procedure call to a data source procedure by way of an Application Program Interface ("API"). The data source procedure is identified by the procedure call identifier 126 without an explicit procedure call identifier mapping. The procedure call is created at least in part by ordering parameters 128 of the procedure call based on an order of the parameters 128 in the web service request. The parameters 128 of the procedure call are ordered without using an explicit parameter mapping. The call module 208 relies on the structure of the web service request to construct a procedure call from the procedure call identifier 126 and parameters 128.

For example, where the web service request is a SOAP request 124, the call module 208 relies on the known structure of the SOAP request 124 to create a procedure call based on the contents of the SOAP request 124 and ordering of parameters 128 in the SOAP request 124. The call module 208 may be part of a data source procedure translator 116 of a servlet 114 or may reside in the web server 102 and may cooperate with a servlet 114 or data source procedure translator 116. In another embodiment, the call module 208 acts independently to create a procedure call.

By relying on the structure of the SOAP request 124, the call module 208 does not need to look to any explicit mapping of parameters. Instead, the call module 208 may use implicit mapping of the procedure call identifier 126 and parameters 128 to construct a procedure call and to send it to a coupled data source server 130, 134, 138. The data source owner does not need to create explicit mapping for the web server 102 acting as a middle layer.

The client 104 also does not need to have any special knowledge about the web server 102, but instead only needs to have knowledge of the data source procedure and associated parameter type and order. The client 104 can then create a SOAP request 124 that complies with SOAP standards and requirements while placing the procedure call identifier 126 and related parameters 128 in the SOAP request 124. By following the simple formatting rules of SOAP and knowing the formatting requirements of the data source procedure being invoked, the client 104 does not need to worry about other information on the web server 102 relating to the data source procedure.

The web server 102 includes a response module 210 that sends a web service response to the client 104 in response to receiving a response from the data source procedure. The web service response includes information responsive to the procedure call generated by the call module 206. The response module 210 may be part of or cooperate with the SOAP return handler 118 of a servlet 114 or may act independently. For example, after the call module 208 generates a procedure call to a data source, such as a DB2 database 132, the DB2 database server 130 typically executes the procedure call and generates a result, which is returned to the web server 102. The response module 210 creates a response based on the results from the DB2 database server 130 and sends the response to the client 104.

If the web service request upon which the procedure call was based is a SOAP request 124, the response module 210 uses the results from the DB2 database server 130 to generate a SOAP message with the results and sends the SOAP message to the client 104 as a response. Typically, the response module 210 would be part of a DB2 servlet 114 (and a SOAP return handler 118 within the servlet 114) if the web server 102 is coupled to a DB2 database 132. In the case where the web server 102 is coupled to only one source, the response module 210 may not be part of a servlet 114 and may act independently or within a SOAP return handler 118. In another embodiment, the response module 210 generates a response to a client 104 using another protocol other than SOAP, such as XML-RPC or REST. One of skill in the art will recognize other possible implementations of a response module 210 that sends a web service response to a client 104 in response to receiving results from an executed data source procedure.

Figure 3:
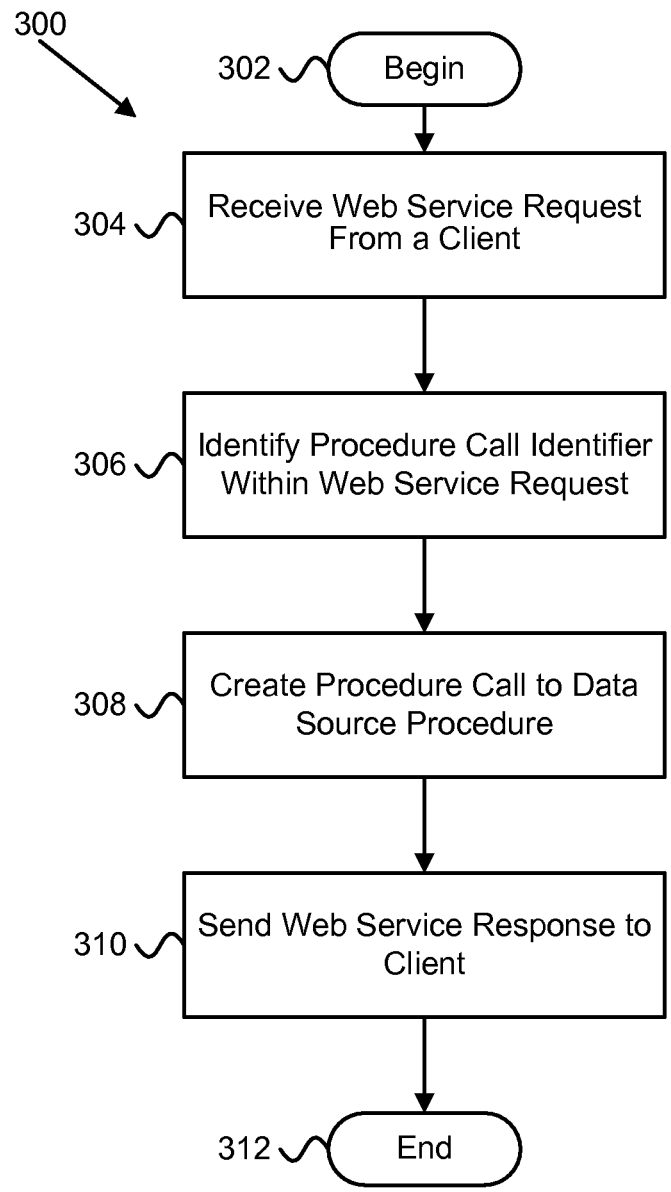
FIG. 3 is a schematic flow chart diagram illustrating one embodiment of a method for web service access to a remote data source procedure in accordance with the present invention.

FIG. 3 is a schematic flow chart diagram illustrating one embodiment of a method 300 for web service access to a remote data source procedure in accordance with the present invention. The method 300 begins 302 and the receive module 202 receives 304 a web service request from a client 104. The web service request includes a procedure call identifier 126 and zero or more parameters 128. The web service request, in one embodiment, is an HTTP request 120. In another embodiment, the web service request is an XML message 122. In yet another embodiment, the web service request is a SOAP request 124.

The identification module 204 identifies 306 a procedure call identifier 126 within the web service request. The call module 206 creates 308 a procedure call to a data source procedure accessible by way of an API. The data source procedure is identified by the procedure call identifier without an explicit procedure call identifier mapping. The procedure call identifier is mapped to the name of the data source procedure in the procedure call. The procedure call is created at least in part by ordering parameters 128 of the procedure call based on an order of the zero or more parameters 128 in the web service request. The parameters 128 of the procedure call are ordered without using an explicit parameter mapping. The response module 210 sends 310 a web service response to the client 104 after receiving a response from the data source procedure and the method 300 ends 312. The web service response includes information responsive to the procedure call.

Figure 4A:
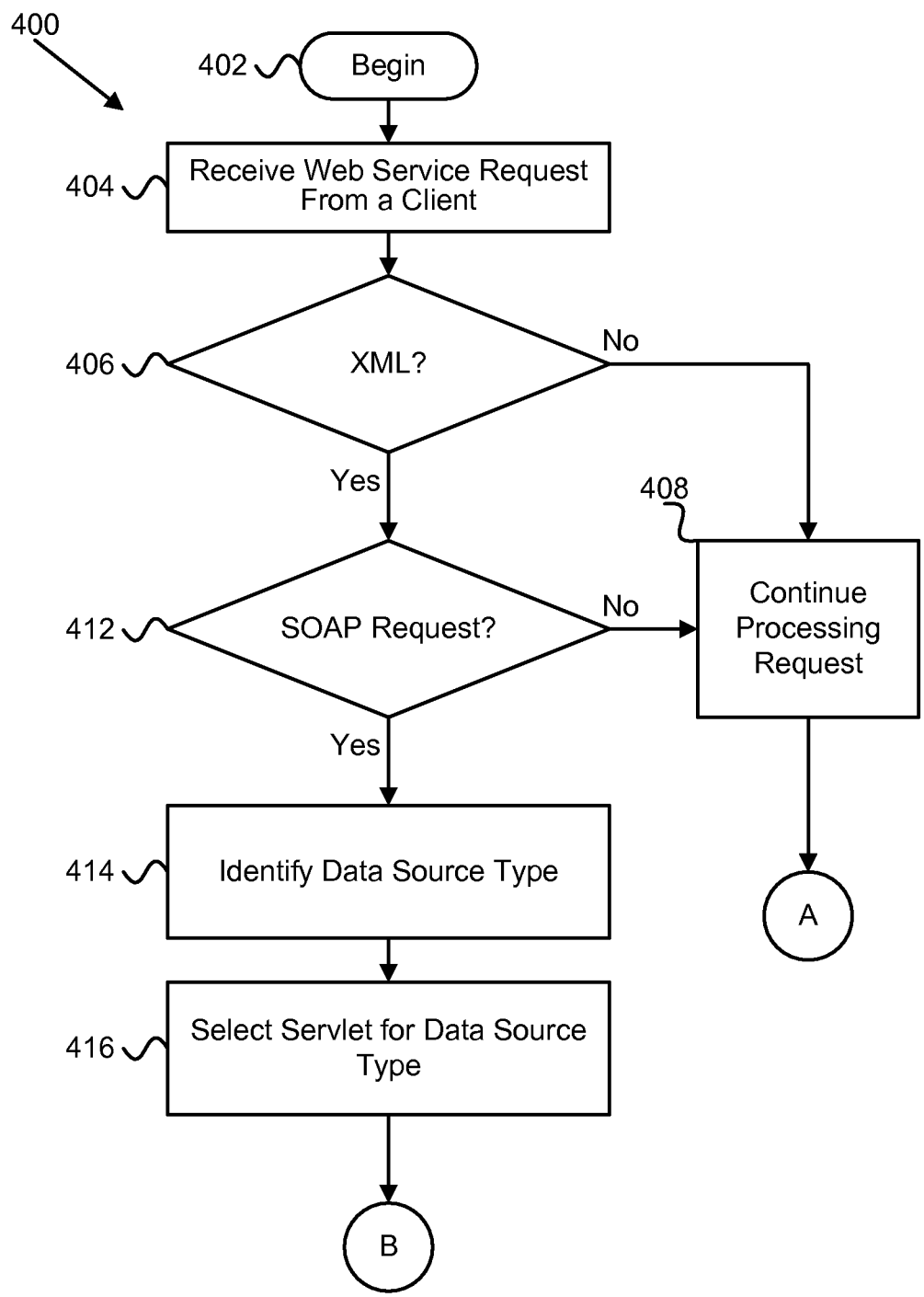
FIG. 4A is a schematic flow chart diagram illustrating a first part of another embodiment of a method for web service access to a remote data source procedure in accordance with the present invention.
Figure 4B:
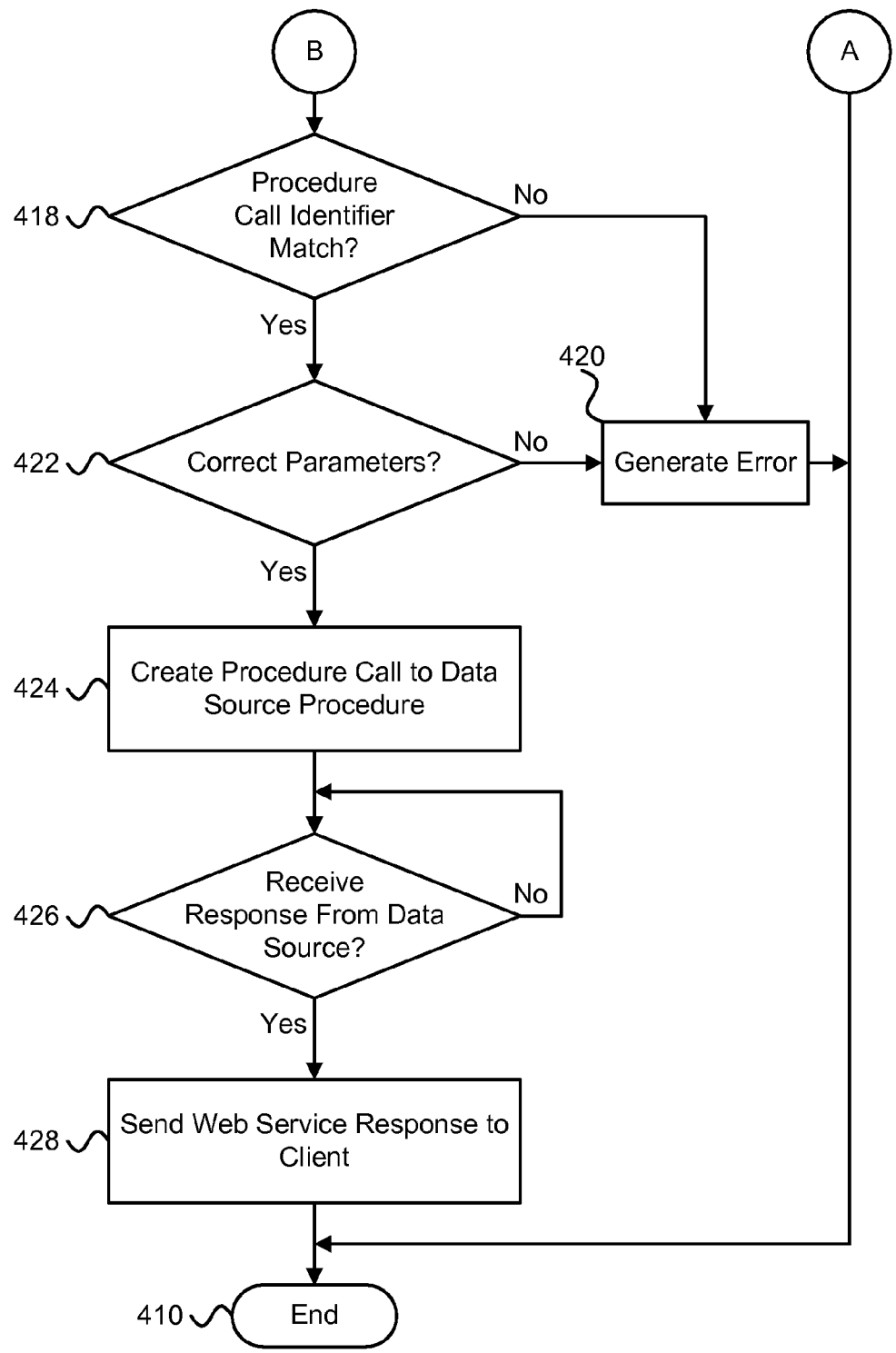
FIG. 4B is a schematic flow chart diagram illustrating a second part of another embodiment of a method for web service access to a remote data source procedure in accordance with the present invention.

FIGS. 4A and 4B are two parts of a schematic flow chart diagram illustrating another embodiment of a method 400 for web service access to a remote data source procedure in accordance with the present invention. The method 400 begins and the receive module 202 receives 404 a web service request from a client 104. The identification module 204 determines 406 if a web service request is an XML message 122. If the identification module 204 determines 406 that the web service request is not an XML message 122, the web server 102 or HTTP handler 110 continues 408 processing the web service request and the method 400 ends 410 (follow A on FIG. 4A to A on FIG. 4B).

If the identification module 204 determines 406 that the web service request is an XML message 122, the identification module 204 determines 412 if the XML message 122 is a SOAP request 124. If the identification module determines 412 that the XML message 122 is not a SOAP request 124, the web server 102 or HTTP handler 110 continues 408 processing the web service request and the method 400 ends 410 (follow A on FIG. 4A to A on FIG. 4B).

Optionally, prior to determining 412 if the XML message 122 is a SOAP request 124, the identification module 204 may determine if the XML message 122 is an as HTTP request 120 using an HTTP POST method. If the XML message 122 is not an HTTP request 120 using an HTTP POST method, the HTTP handler 110 continues 408 processing the request. In an alternate embodiment, the web server 102 or HTTP handler 110 may process a web service request received 404 by the receive module 202 and may only invoke the identification module 204 if the web service request cannot be processed by the HTTP handler 110 or similar handler in the web server 102. Web service requests can be either filtered or parsed out prior to processing by the HTTP handler 110 or may be first processed and then filtered using the identification module 204 after the web service request is unsuccessfully processed by the HTTP handler 110 or similar handler in the web server 102.

If the identification module 204 determines 412 that the XML message 122 is a SOAP message 124, the database selection module 206 identifies 414 the data source or database 132, 136, 140 listed in the SOAP request 124 and selects 416 the applicable data source or database 132, 136, 140. The identification module 204 determines 418 if the SOAP request 124 includes a procedure call identifier 126 and if the procedure call identifier 126 matches a data source procedure supported by the data source or database 132, 136, 140 coupled to the web server 102 (follow "B" on FIG. 4A to "B" on FIG. 4B). If the identification module 204 determines 418 that the SOAP request 124 does not includes a procedure call identifier 126 or if the identification module 204 determines 418 that the procedure call identifier 126 does not match a supported data source procedure, the identification module 204 generates 420 an error and the method 400 ends 410.

If the identification module 204 identifies 418 a procedure call identifier 126 and if the procedure call identifier 126 matches a supported data source procedure of a coupled data source or database 132, 136, 140, the identification module 204 determines 422 if the parameters 128 are of a correct type, range, etc. based on requirements of the data source procedure. If the identification module 204 determines 422 that the parameters 128 are not correct, the identification module 204 generates 420 an error and the method 400 ends 410.

If the identification module 204 determines 422 that the parameters 128 are correct, the call module 208 creates 424 a procedure call to the data source procedure based on the procedure call identifier 126 and the parameters 128 of the SOAP request 124. The call module 208 creates 424 the procedure call by using the procedure call identifier 126 as the name of the stored procedure and by ordering the parameters 128 of the SOAP request 124 in the same order that the parameters 128 are listed in the SOAP request 124 without an explicit mapping. Note that creating 424 a procedure call also includes transmitting the call to the coupled data source.

The response module 210 determines 426 if a response to the procedure call has been received from the coupled data source. In one embodiment, the response module 210 continues to wait for a response from the coupled data source. In another embodiment (not shown), if the response module 210 determines 426 that no response has been received, for example after a timeout period has expired, the response module 210 generates 414 an error and the method 400 ends.

Once the response module 210 determines 426 that a response has been received, the response module 210 sends 428 a web service response to the client 104 that is based on the response from the coupled data source, and the method 400 ends 410. The response module 210 formats the response to the client 104 using the same protocol as the web service request. In the depicted embodiment, the response module 210 formats a SOAP response using the results returned from the coupled data source.

The method 400 depicted in FIGS. 4A and 4B may be modified and customized as necessary based on a chosen protocol of the web service request and the number and type of coupled data sources. The method 400 may be implemented in the web server 102 in a generic way so without explicit mapping based on data source procedures of one or more coupled data sources. This allows a client 104 to use a standard protocol, such as SOAP, to format a web service request and to simply use the procedure call identifier as the name of the data source procedure and order parameters based on data source procedure requirements without having to follow additional requirements of a middle layer explicit mapping.

Figure 5:
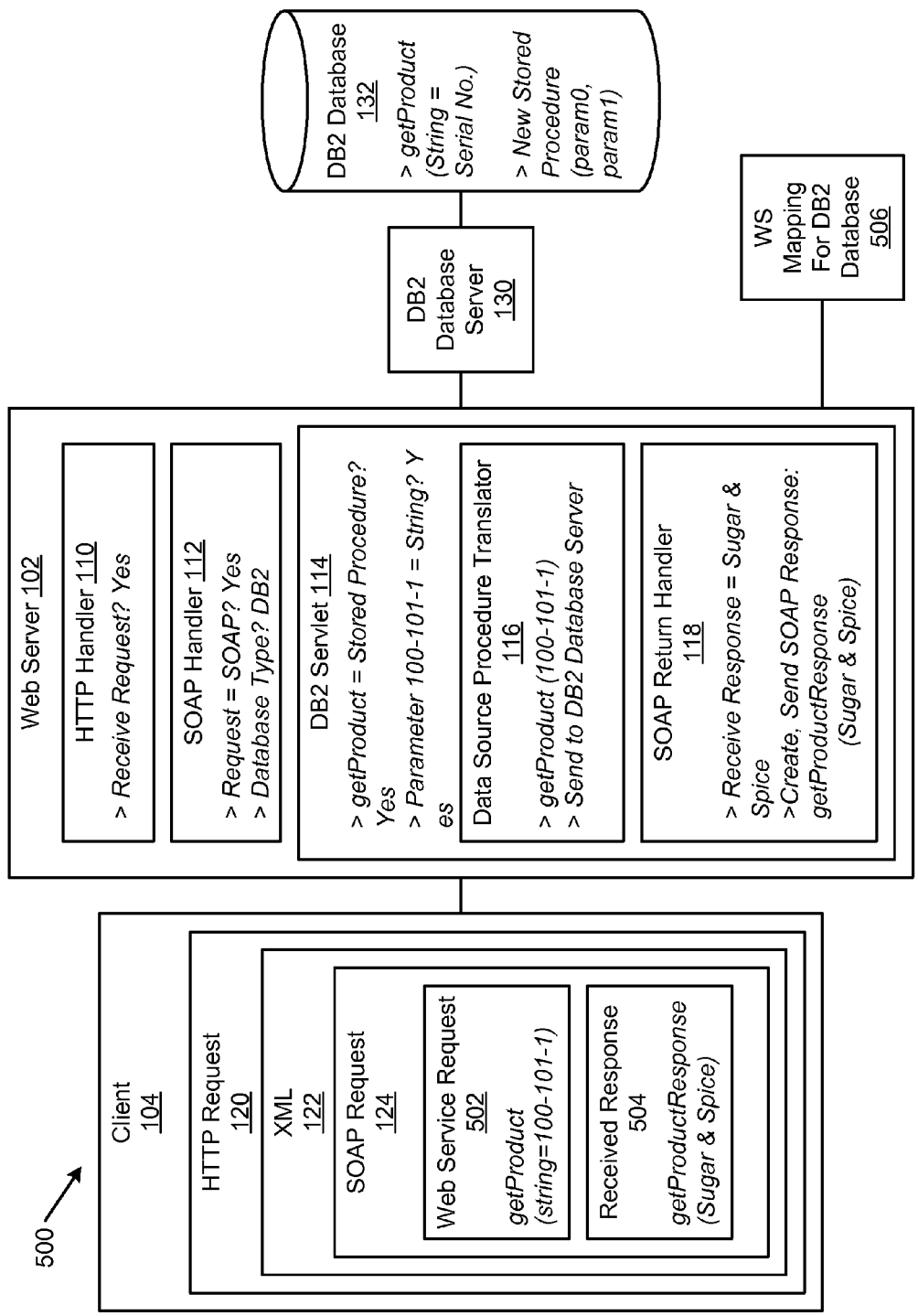
FIG. 5 is a schematic block diagram illustrating a particular example of a system for web service access to a remote data source procedure in accordance with the present invention.

FIG. 5 is a schematic block diagram illustrating a particular example of a system 500 for web service access to a remote data source procedure in accordance with the present invention. The system 500 includes a web server 102 with an HTTP handler 110, a SOAP handler 112, and a DB2 servlet 114 with a Data Source Procedure Translator 116 and a SOAP return handler 118, which are substantially similar to those described above. The system 500 also includes a client 104 as described above with a web service request 502 formatted as a SOAP request 124 and an XML message 122 and is an HTTP request 120. The client 104 also includes a received response 504 that again is formatted as a SOAP request 124 and an XML message 122 and is an HTTP request 120. The web service request 502 and received response 504 are described below. The system 500 also includes a DB2 database server 130 and a DB2 database 132 substantially similar to those described above, but does not include an explicit web services mapping 506 on the web server 102 for the DB2 database 506.

The client 104 may generate a web service request 502 for a data source procedure called getProduct with a procedure call identifier 126, or namespace, of "getProduct." The web service request 502 includes a parameter 128 "100-101-1," which is a string representing a serial number. The client 104 sends the web service request 502 to the DB2 database server 130 by way of the web server 102 to invoke the "getProduct"

procedure in the DB2 database server 130. The web service request 502 is formatted an XML SOAP request 122, 124 and send using an HTTP POST method.

The following is one example of a SOAP request for the "getProduct" data source procedure:

```
POST /DEMO HTTP/1.1
Host: localhost
Connection: Keep-Alive
User-Agent: PHP SOAP 0.1
Content-Type: text/xml; charset=utf-8
SOAPAction: "http://ibm.com/db2/soap#getProduct"
Content-Length: nnn
<?xml version="1.0" encoding="UTF-8"?>
<SOAP-ENV:Envelope
   xmlns:SOAP-ENV="http://schemas.xmlsoap.org/soap/envelope/"
   xmlns:ns1="http://ibm.com/db2/soap"
   xmlns:xsd="http://www.w3.org/2001/XMLSchema"
   xmlns:xsi="http://www.w3.org/2001/XMLSchema-instance"
   xmlns:SOAP-ENC="http://schemas.xmlsoap.org/soap/encoding/"
   SOAP-ENV:encodingStyle="http://schemas.xmlsoap.org/soap/encoding/"
   >
   <SOAP-ENV:Body>
      <ns1:getProduct>
         <param0 xsi:type="xsd:string">100-101-01</param0>
      </ns1:getProduct>
   </SOAP-ENV:Body>
</SOAP-ENV:Envelope>
```

In this example web service request 502, the procedure call identifier 126 is defined as a namespace or "signature" as "http://ibm.com/db2/soap#getProduct." This signature also identifies the database 132 as DB2. In this simple example, only one parameter 128 is included and is labeled param0. Where other parameters 128 are submitted, they must be ordered in the SOAP request 124 based on an order requirement of the getProduct data source procedure.

The receive module 202 in the HTTP handler 110 receives the web service request 502. The identification module 204 in the SOAP Handler 112 verifies that the web service request 502 is a SOAP request 124 as well as verifies that the web service request is an XML message 122 (not shown). The database selection module 122 determines that the web service request 502 is directed to the DB2 database 132 ("xmlns:ns1=http://ibm.com/db2/soap") and sends the request 502 to the DB2 servlet 114.

The identification module 204 (or a portion of the identification module residing in the DB2 servlet 114) if the procedure call identifier 126, "getProduct," is a data source procedure (stored procedure) supported by the DB2 database server 130 and optionally if the "100-101-1" parameter 128 is a string. The call module 210 in data source procedure translator 116 within the DB2 servlet 114 then creates a procedure call to the DB2 database server 130. Because the DB2 servlet 114 handles DB2 stored procedures, the data source procedure translator 116 within the DB2 servlet 114 is able to format procedure calls specific to the DB2 database server 130. The DB2 servlet 114 or data source procedure translator 116 submits the procedure call to the DB2 database server 130 by way of a client interface using an API. Typically the client interface is JDBC is used, but ODBC, OLE DB, CLI, or the like may be used.

The DB2 database server 130 executes the "getProduct" procedure call and retrieves data from the DB2 database 132 responsive to the "100-101-1" parameter 128 and the "getProduct" procedure. In this example, the results are the string "Sugar & Spice." The DB2 database server 130 returns results to the web server 102 and response module 210 in the SOAP return handler 118 of the DB2 servlet 114 creates a SOAP response based on the response received from the DB2 database server 130 that relates to the "getProduct" procedure call. The SOAP response is then returned to the client 104 (depicted as the received response 504).

In this example, the "Sugar & Spice" string may be coded in a SOAP message as follows:

```
HTTP/1.1 200 OK
Date: Tue, 01 Aug 2006 20:34:45 GMT
Server: Apache/2.0.58
Content-Length: nnn
Keep-Alive: timeout=15, max=100
Connection: Keep-Alive
Content-Type: text/xml; charset=utf-8
<?xml version="1.0" encoding="UTF-8"?>
<SOAP-ENV:Envelope
   xmlns:SOAP-ENV="http://schemas.xmlsoap.org/soap/envelope/"
   xmlns:SOAP-ENC="http://schemas.xmlsoap.org/soap/encoding/"
   xmlns:xsd="http://www.w3.org/1999/XMLSchema"
   xmlns:xsi="http://www.w3.org/1999/XMLSchema-instance"
   xmlns:ns1="http://ibm.com/db2/soap"
   >
   <SOAP-ENV:Body>
      <ns1:getProductResponse>
         <return xsi:type="xsd:string">Sugar & Creamer</return>
      </ns1:getProductResponse>
   </SOAP-ENV:Body>
</SOAP-ENV:Envelope>
```

The system 500 is beneficial because another stored procedure may be added to the DB2 database 132 without explicit mapping being added to the web server 102. In this example, the DB2 database 132 includes a stored procedure called "New Stored Procedure" and requires two parameters, param0 and param1. As long at the client 104 knows the name of the stored procedure and the order and type of the parameters 128, the client 104 can create a SOAP request 124 with the proper procedure call identifier 126 and parameters 128 ordered correctly and can have confidence that the SOAP message will be translated properly into an effective procedure call to the DB2 database 132. The database owner does not need to create an explicit web services mapping on the web server 102 for the DB2 database 506.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a storage device storing executable code executed by a processor to perform operations for web service access to a remote data source procedure, the operations of the computer program product comprising:

receiving a web service request from a client, the web service request comprising a procedure call identifier and first parameters;

identifying a database type from the web service request;

selecting a servlet compatible with the database type;

identifying the procedure call identifier within the web service request with the selected servlet;

creating a procedure call to a data source procedure for a database server of the database type and accessible by way of an Application Program Interface ("API"), the data source procedure identified by the procedure call identifier without an explicit procedure call identifier mapping, the procedure call created using the procedure call identifier as a data source procedure name with the first parameters appended to the data source procedure name as second parameters and ordering the second parameters of the procedure call with a same order as the first parameters in the web service request, the second parameters of the procedure call ordered without using an explicit parameter mapping;

transmitting the procedure call to the database server; and sending a web service response to the client in response to receiving a response from the data source procedure, the web service response comprising information responsive to the procedure call.

2. The computer program product of claim 1, further comprising confirming that the data source procedure associated with the procedure call identifier is supported by the database server.

3. The computer program product of claim 1, further comprising verifying that the type of data for the first parameters of the web service request matches the second parameters of the data source procedure.

4. The computer program product of claim 1, wherein the web service request comprises a Simple Object Access Protocol ("SOAP") request.

5. The computer program product of claim 4, wherein the SOAP request is coded using an extended markup language ("XML") and a Hyper Text Transfer Protocol ("HTTP").

6. The computer program product of claim 1, wherein the procedure call comprises a database call and the data source procedure comprises a database stored procedure managed by the database server.

7. The computer program product of claim 6, the servlet creating the procedure call compatible with the database type and creating the web service response being based on a response from the database server.

8. The computer program product of claim 6, wherein the database call comprises a native call to the database server, the native call compatible with a client interface supported by the database server.

9. The computer program product of claim 8, wherein the client interface comprises one of Java Database Connectivity ("JDBC"), Object Linking and Embedding Database ("OLE DB"), Open Database Connectivity ("ODBC"), and Call Level Interface ("CLI").

10. The computer program product of claim 8, wherein the database server comprises one of DB2, Oracle, MySQL, and Sybase.

11. The computer program product of claim 1, wherein ordering the second parameters of the procedure call without using an explicit parameter mapping further comprises ordering the second parameters of the procedure call without referencing an explicit mapping defined for an application server receiving the web service request.

12. The computer program product of claim 1, wherein the web service request comprises one of an XML Remote Procedure Call ("XML-RPC") request and a Representational State Transfer ("REST") request.

13. An apparatus for web service access to a remote data source procedure, the apparatus comprising:
a storage device storing executable code;
a processor executing the executable code, the executable code comprising:
a receive module receiving a web service request from a client, the web service request comprising a procedure call identifier and first parameters;
a database module identifying a database type from the web service request and selecting a servlet compatible with the database type;
an identification module identifying the procedure call identifier within the web service request with the servlet;
a call module creating a procedure call to a data source procedure for a database server of the database type and accessible by way of an Application Program Interface ("API"), the data source procedure identified by the procedure call identifier without an explicit procedure call identifier mapping, the procedure call created using the procedure call identifier as a data source procedure name with the first parameters appended to the data source procedure name as second parameters and ordering the second parameters of the procedure call with a same order as the first parameters in the web service request, the second parameters of the procedure call ordered without using an explicit parameter mapping, and transmitting the procedure call to the database server; and
a response module sending a web service response to the client in response to receiving a response from the data source procedure, the web service response comprising information responsive to the procedure call.

14. The apparatus of claim 13, wherein the identification module further comprises confirming that the data source procedure associated with the procedure call identifier is supported by the database server.

15. The apparatus of claim 13, wherein the identification module further comprises verifying that the type of data for the first parameters of the web service request matches the second parameters of the data source procedure.

16. The apparatus of claim 13, wherein the web service request comprises a Simple Object Access Protocol ("SOAP") request.

17. The apparatus of claim 16, wherein the SOAP request is coded using an extended markup language ("XML") and a Hyper Text Transfer Protocol ("HTTP").

18. The apparatus of claim 13, wherein the procedure call comprises a database call and the data source procedure comprises a database stored procedure.

19. The apparatus of claim 18, the servlet creating the procedure call compatible with the database type and creating the web service response being based on a response from the database server.

20. The apparatus of claim 18, wherein the database call comprises a call to the database server.

21. The apparatus of claim 20, wherein the database server comprises one of DB2, Oracle, MySQL, and Sybase.

22. The apparatus of claim 13, wherein the call module orders the second parameters of the procedure call without referencing an explicit mapping defined for an application server receiving the web service request.

23. The apparatus of claim 13, wherein the web service request comprises one of an XML Remote Procedure Call ("XML-RPC") request and a Representational State Transfer ("REST") request.

24. A system for web service access to a remote data source procedure, the system comprising:
a database server;
a web server comprising at least one processor and a memory, the web server in communication with the database server and a client, the web server comprising:
a receive module receiving a web service request from the client, the web service request comprising a procedure call identifier and first parameters;

a database selection module identifying a database type from the web service request and selecting a servlet compatible with the database type;

an identification module identifying the procedure call identifier within the web service request with the servlet;

a call module creating a procedure call to a data source procedure for the database server of the database type and accessible by way of an Application Program Interface ("API"), the data source procedure identified by the procedure call identifier without an explicit procedure call identifier mapping, the procedure call created using the procedure call identifier as a data source procedure name with the first parameters appended to the data source procedure name as second parameters and ordering the second parameters of the procedure call with a same order as the first parameters in the web service request, the second parameters of the procedure call ordered without using an explicit parameter mapping, and transmitting the procedure call to the database server; and a response module sending a web service response to the client in response to receiving a response from the data source procedure, the web service response comprising information responsive to the procedure call.

25. The system of claim 24, wherein the database server comprises one of a DB2 server, an Oracle server, a MySQL server, and a Sybase server and the database comprises a format compatible with the database server.

26. A method for making a computer implemented process to enable web service access to a remote data source procedure, the method comprising:

instantiating first computer instructions onto a storage device, the first instructions receiving a web service request from a client, the web service request comprising a procedure call identifier and at least one first parameters;

instantiating fifth computer instructions onto the storage device, the fifth instructions identifying a database type from the web service request and selecting a servlet compatible with the database type;

instantiating second computer instructions onto the storage device, the second instructions identifying the procedure call identifier within the web service request with the servlet;

instantiating third computer instructions onto the storage device, the third instructions configured to create a procedure call to a data source procedure for a database server of the database type and accessible by way of an Application Program Interface ("API"), the data source procedure identified by the procedure call identifier without an explicit procedure call identifier mapping, the procedure call created using the procedure call identifier as a data source procedure name with the first parameters appended to the data source procedure name as second parameters and ordering the second parameters of the procedure call with a same order as the first parameters in the web service request, the second parameters of the procedure call ordered without using an explicit parameter mapping, and transmitting the procedure call to the database server; and instantiating fourth computer instructions onto the storage device, the fourth instructions configured to send a web service response to the client in response to receiving a response from the data source procedure, the web service response comprising information responsive to the procedure call.

27. The method of claim 26, further comprising confirming that the data source procedure associated with the procedure call identifier is supported by the databa server.

28. The method of claim 26, further comprising verifying that the type of data for the first parameters of the web service request matches the second parameters of the data source procedure.

29. The method of claim 26, wherein the web service request comprises a Simple Object Access Protocol ("SOAP") request.

30. The method of claim 29, wherein the SOAP request is coded using an extended markup language ("XML") and a Hyper Text Transfer Protocol ("HTTP").

31. The method of claim 26, wherein the procedure call comprises a database call and the data source procedure comprises a database stored procedure.

32. The method of claim 31, the servlet creating the procedure call compatible with the database type and creating the web service response based on a response from the database server.

33. A method for deploying a web access computer program for web service access to a remote data source procedure, the method comprising:

determining customer requirements for database access via a web server; and deploying a web access computer program, the web access computer program comprising receiving a web service request from a client, the web service request comprising a procedure call identifier and first parameters;

identifying a database type from the web service request;

selecting a servlet compatible with the database type;

identifying the procedure call identifier within the web service request with the selected servlet;

creating a procedure call to a data source procedure for a database server of the database type and accessible by way of an Application Program Interface ("API"), the data source procedure identified by the procedure call identifier without an explicit procedure call identifier mapping, the procedure call created using the procedure call identifier as a data source procedure name with the first parameters appended to the data source procedure name as second parameters and ordering the second parameters of the procedure call with a same order as the first parameters in the web service request, the second parameters of the procedure call ordered without using an explicit parameter mapping;

transmitting the procedure call to the database server; and sending a web service response to the client in response to receiving a response from the data source procedure, the web service response comprising information responsive to the procedure call.

* * * * *